(12) United States Patent
Sagara

(10) Patent No.: US 8,068,395 B2
(45) Date of Patent: Nov. 29, 2011

(54) RECORDING DEVICE AND METHOD OF ADJUSTING LASER POWER

(75) Inventor: Seiichi Sagara, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/829,862

(22) Filed: Jul. 2, 2010

(65) Prior Publication Data

US 2011/0026387 A1    Feb. 3, 2011

(30) Foreign Application Priority Data

Jul. 30, 2009  (JP) ................................. 2009-177296

(51) Int. Cl.
*G11B 7/00*    (2006.01)

(52) U.S. Cl. ..................................... 369/47.53; 369/116

(58) Field of Classification Search .................. 369/116, 369/47.53, 47.52, 47.55
See application file for complete search history.

(56) References Cited

U.S. PATENT DOCUMENTS

| 7,835,254 B2 * | 11/2010 | Adachi et al. ................. 369/116 |
| 2005/0219981 A1 | 10/2005 | Iimura |
| 2007/0127341 A1 | 6/2007 | Sagara et al. |

FOREIGN PATENT DOCUMENTS

| JP | 2005-259312 | 9/2005 |
| JP | 2005-293689 | 10/2005 |
| JP | 2006-120281 | 5/2006 |
| JP | 2008-77714 | 4/2008 |

* cited by examiner

*Primary Examiner* — Nabil Z Hindi
(74) *Attorney, Agent, or Firm* — Oblon, Spivak, McClelland, Maier & Neustadt, L.L.P.

(57) ABSTRACT

A recording device including: an optical head section for irradiating a recording medium with laser to record and reproduce information; a laser driving section for driving the optical head section to output laser; and a control section for, in a process of adjusting recording laser power output from the optical head section, obtaining an evaluation value of a recorded area after a predetermined period of time elapsed since data was recorded as an evaluation value about a reproduction signal during reproduction of the recorded data, and adjusting recording laser power on the basis of the evaluation value after the predetermined period of time elapsed since data was recorded.

8 Claims, 9 Drawing Sheets

RECORDING DEVICE AND METHOD OF ADJUSTING LASER POWER

BACKGROUND OF THE INVENTION

1. Field of the Invention

The present invention relates to a recording device and a method of adjusting laser power.

2. Description of the Related Art

It is necessary for recordable media, such as write-once optical discs and rewritable optical discs, to optimize recording laser power. The optimization process is called optimum power control (OPC) and various methods have been proposed therefor.

Usually, an optical disc is subject to OPC before data is recorded thereon. For example, test data is recorded in a predetermined test area on a disc with varying laser power. The recorded area is reproduced and an evaluation value of a reproduction signal is detected. The evaluation value may include a beta value, a modulation factor, jitter, asymmetry and a symbol error rate.

It is determined on the basis of the evaluation value which laser power might provide the optimum quality of the reproduction signal. Thus, the optimum laser power is determined.

OPC may also be executed during recording.

Japanese Unexamined Patent Application Publication Nos. 2005-259312 and 2005-293689 disclose techniques relating to running OPC.

Japanese Unexamined Patent Application Publication Nos. 2008-77714 and 2006-120281 disclose techniques relating to walking OPC.

SUMMARY OF THE INVENTION

Related Art OPC is executed on the assumption that the evaluation value does not vary with the elapse of time from recording to reading.

With a recent increase in highly sensitive discs developed to meet the demand of high-speed data processing, however, the evaluation value may vary during recording and recording in some discs.

FIG. 9 illustrates exemplary variation of an evaluation value beta with the elapse of time from recording to reproduction.

The beta value is obtained from an equation: beta=(Ip+Ib)/(Ip−Ib) where Ip is a peak value of a reproduction RF signal and Ib is a bottom value.

In FIG. 9A, the vertical axis represents the beta value and the horizontal axis represents time [ms] elapsed from recording to reproduction.

During an OPC session, data is reproduced immediately after being recorded and the evaluation value is measured.

The time elapsed from recording to reproduction corresponds to the elapsed time described above.

The beta value to be measured varies with the elapse of time as illustrated in FIG. 9A.

Usually, the time elapsed from recording to reproduction is, for example, about 20 ms including seek time from a position at which recording ends to a position at which the data is reproduced (e.g., a position at which recording is started).

Actually, however, the time elapsed from recording to reproduction is not fixed because of, for example, variation of seek time and occurrence of servo retry due to disturbance. When servo retry occurs, the time elapsed may be as long as 50 to 100 ms and even 150 ms or longer.

As a result, the beta value corresponding to certain laser power may vary with the elapse of time from recording to reproduction on the basis of the characteristics illustrated in FIG. 9A.

A target beta value is, for example, 5%.

As illustrated in FIG. 9B, if the time elapsed from recording to reproduction is 20 ms, the beta value becomes 5% with the recording laser power of about 7 mW.

If the time elapsed from recording to reproduction is 50 ms, the beta value becomes 5% with the recording laser power of 8.5 mW.

Although the optimum recording laser power is determined with the beta value being the target beta value, the optimum recording laser power to be determined may vary with the elapse of time.

That is, the determined laser power may vary with the elapse of time from recording to reproduction, which is different for each OPC session. As a result, the OPC session is not suitably executed.

Although the beta value was illustrated, other evaluation values, such as a modulation factor and jitter, also vary with the elapse of time in the recent highly sensitive discs.

It is therefore desirable to suitably execute the OPC session regardless of variation of evaluation values occurring with the elapse of time.

A recording device according to an embodiment of the invention includes: an optical head section for irradiating a recording medium with laser to record and reproduce information; a laser driving section for driving the optical head section to output laser; and a control section for, in a process of adjusting recording laser power output from the optical head section, obtaining an evaluation value of a recorded area after a predetermined period of time elapsed since data was recorded as an evaluation value about a reproduction signal during reproduction of the recorded data, and adjusting recording laser power on the basis of the evaluation value after the predetermined period of time elapsed since data was recorded.

The control section causes the optical head section and the laser driving section to execute test recording on the recording medium and, immediately after that, reproduce the test recording execution area; and the control section obtains the evaluation value after the predetermined period of time elapsed since data was recorded through correction of the evaluation value obtained from a reproduction signal during reproduction in accordance with the elapse of time from test recording to the reproduction.

The control section alternatively causes the optical head section and the laser driving section to execute test recording on the recording medium and, after predetermined standby time, reproduce the test recording execution area to obtain the evaluation value after the predetermined period of time elapsed since data was recorded as the evaluation value obtained from a reproduction signal during reproduction.

As a process of adjusting the recording laser power during recording user data on a recording medium by the optical head section and the laser driving section (i.e., walking OPC), the control section reproduces data in an area recorded immediately therebefore and thus obtains the evaluation value after the predetermined period of time elapsed since data was recorded by correcting the evaluation value obtained from a reproduction signal during reproduction in accordance with the elapse of time from recording to the reproduction in the area and adjusts the recording laser power during recording on the basis of the evaluation value after the predetermined period of time elapsed since data was recorded.

The control section alternatively reproduces, with predetermined standby time since the most recent recording, data in an area recorded immediately therebefore and thus obtains the evaluation value after the predetermined period of time elapsed since data was recorded as the evaluation value obtained from a reproduction signal during reproduction, and adjusts recording laser power for recording on the basis of the evaluation value after the predetermined period of time elapsed since data was recorded.

The control section reproduces data in an area recorded a predetermined period of time before the most recent recording, and thus obtains the evaluation value after the predetermined period of time elapsed since data was recorded as the evaluation value obtained from a reproduction signal during reproduction, and adjusts recording laser power for recording on the basis of the evaluation value after the predetermined period of time elapsed since data was recorded.

If a predetermined period of time has elapsed since the user data recording was started, the control section reproduces an area in which data was recorded at least a predetermined period of time before the recording of the user data and, if a predetermined period of time has not elapsed since the user data recording was started, the control section stands by for a necessary period of time and then reproduces an area which is considered to be recorded at least a predetermined period of time before the most recent recording, and thus obtains the evaluation value after the predetermined period of time elapsed since data was recorded as the evaluation value obtained from a reproduction signal during reproduction, and adjusts recording laser power for recording on the basis of the evaluation value after the predetermined period of time elapsed since data was recorded.

A method of adjusting recording laser power according to an embodiment of the invention includes steps of: obtaining an evaluation value after the predetermined period of time elapsed since data was recorded in a recorded area as an evaluation value about a reproduction signal during reproduction of the recorded data, and adjusting recording laser power on the basis of the evaluation value after the predetermined period of time elapsed since data was recorded.

According to the invention, an evaluation value, such as a beta value, is obtained after predetermined time elapsed from recording to reproduction. The evaluation value obtained after predetermined time elapsed may be an evaluation value obtained at a certain point after "predetermined time" elapsed or, alternatively, an evaluation value obtained after "predetermined time" elapsed as a period of time in which evaluation value variation is stabilized. In particular, the evaluation value measured at varying elapsed time is corrected in accordance with the length of the elapsed time. Alternatively, an evaluation value after evaluation value variation is stabilized is measured by reproducing the data after the control section stands by for the time elapsed after recording.

According to the invention, the optimum recording power can be determined precisely for recording media of which evaluation values vary with the elapse of time from recording to reading during an OPC session. Thus, a suitable recording operation is provided.

DESCRIPTION OF THE PREFERRED EMBODIMENTS

Figure 1:
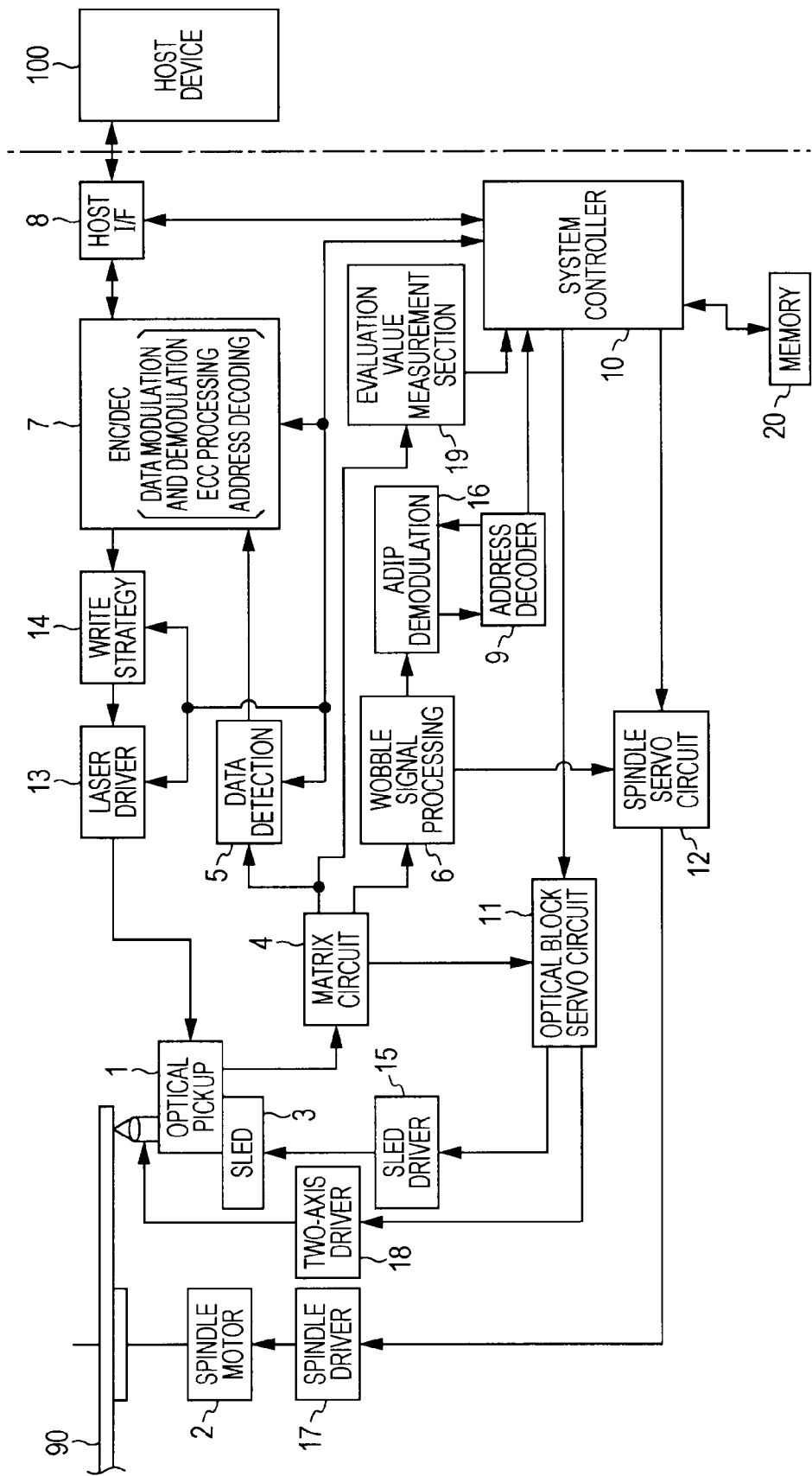
FIG. 1 is a block diagram of a disk drive device according to an embodiment of the invention.

Hereinafter, embodiments of the invention will be described. Here, a disk drive device which records on and reproduces from a recordable optical disc will be illustrated as an example of a recording device in accordance with the invention. OPC in the disk drive device will be described. Description will be given in the following order.
1. Configuration of Disk Drive Device
2. First Embodiment: OPC Example I
3. Second Embodiment: OPC Example II
4. Third Embodiment: Walking OPC Example I
5. Fourth Embodiment: Walking OPC Example II
6. Fifth Embodiment: Walking OPC Example III
7. Sixth Embodiment: Walking OPC Example IV 1. Configuration of Disk Drive Device A configuration of a disk drive device in accordance with an embodiment will be described with reference to FIG. 1.

The disk drive device in accordance with the present embodiment is, for example, a recording/reproducing apparatus which records and reproduces data on and from optical discs, such as Blu-ray discs (registered trademark) and digital versatile discs (DVD). The disk drive device has advantage in an OPC session for recordable discs, such as phase change discs and dye alteration discs.

When loaded in a disk drive device, an optical disc 90 is placed on a turn table (not illustrated) and is driven to rotate at a certain linear velocity (CLV) by a spindle motor 2 during recording and reproduction of data.

During reproduction of data, marked information recorded on tracks of the optical disc 90 is read by an optical pickup (i.e., an optical head section) 1.

During recording of data on the optical disc 90, user data is recorded on the tracks of the optical disc 90 by the optical pickup 1 as phase change marks or dye alteration marks.

Physical information of the disc is recorded as reproduction-only management information in, for example, an inner circumferential area 91 of the optical disc 90 in the form of embossed pits or wobbling grooves. Such information is also read by the optical pickup 1.

Address in Pregroove (ADIP) information embedded as wobbles of groove tracks on the disc 90 is also read from the optical disc 90 by the optical pickup 1.

The optical pickup 1 includes a laser diode, a photodetector, an optical lens and an optical system. The laser diode is used as a laser light source. The photodetector is used to detect reflected light. The object lens is used as an output terminal of laser beams. The optical system irradiates a recording surface of the disc with a laser beam via the object lens and guides the reflected light to the photodetector.

In the optical pickup 1, the object lens is held by a two-axis mechanism to be movable in a tracking direction and a focusing direction.

The entire optical pickup 1 is movable in a radial direction of the disc by a sled mechanism 3.

The laser diode in the optical pickup 1 is driven by a drive signal (i.e., a drive current) output from a laser driver 13 to emit laser light.

Reflected light information output from the disc 90 is detected by the photodetector, converted into an electrical signal in accordance with an amount of received light and then supplied to a matrix circuit 4.

The matrix circuit 4 includes a current voltage conversion circuit and a matrix operational amplifier circuit in accordance with an output current from a plurality of light receiving elements used as photodetectors. The matrix circuit 4 generates necessary signals through a matrix operation.

The matrix circuit 4 generates, for example, a reproduced information signal (i.e., a RF signal) which corresponds to reproduced data, a focus error signal for servo control and a tracking error signal.

The matrix circuit 4 also generates a push pull signal as a signal relating to wobbling of a groove, i.e., a signal for detecting wobbling.

The RF signal output from the matrix circuit 4 is supplied to a data detection section 5 and an evaluation value measurement section 19. The focus error signal and the tracking error signal are supplied to an optical block servo circuit 11. The push pull signal is supplied to a wobble signal processing circuit 15.

The data detection section 5 binarizes the RF signal.

The data detection section 5 executes A/D conversion of the RF signal, generates reproduction clocks with a phase locked loop (PLL), equalizes partial response (PR) and executes Viterbi decoding (i.e., maximum likelihood decoding). The data detection section 5 obtains a binary data line through partial response maximum likelihood decoding (PRML).

The data detection section 5 then supplies the binary data line to a subsequent encoding and decoding section 7 as information read from the optical disc 90.

The encoding and decoding section 7 demodulates data to be reproduced during reproduction and modulates data to be recorded during recording. For example, the encoding and decoding section 7 executes data demodulation, deinterleaving, ECC decoding and address decoding during reproduction and executes ECC encoding, interleaving and data modulation during recording.

During reproduction of data, the binary data line decoded by the data detection section 5 is supplied to the encoding and decoding section 7. The encoding and decoding section 7 demodulates the binary data line and obtains reproduced data from the optical disc 90. For example, the encoding and decoding section 7 demodulates the data which has been subject to run length limited code modulation and recorded on the optical disc 90 and then executes ECC decoding as error correction to obtain reproduced data from the optical disc 90.

The data decoded by the encoding and decoding section 7 into reproduced data is transmitted to a host interface 8 and then to a host device 100 as instructed by a system controller 10. The host device 100 may be a computer device or an audio-visual (AV) system device.

The ADIP information is processed in recording and reproduction on and from the optical disc 90.

In particular, the push pull signal output from the matrix circuit 4 as a signal relating to wobbling of a groove is digitized in a wobble signal processing circuit 6 to provide wobble data. Clocks synchronized with the push pull signal are generated by the PLL process.

The wobble data is demodulated in an ADIP demodulating circuit 16 into a data stream which constitutes an ADIP address and is supplied to an address decoder 9.

The address decoder 9 decodes the supplied data, obtains an address value and supplies the obtained address value to the system controller 10.

In recording the data, the data to be recorded is transmitted from the host device 100. The data to be recorded is supplied to the encoding and decoding section 7 via the host interface 8.

The encoding and decoding section 7 herein adds an error correction code (ECC encoding), interleaves the data and adds a sub-code as an encoding process of the data to be recorded. The encoding and decoding section 7 also executes run length limited code modulation to the thus-processed data.

The thus-processed data to be recorded is sent to a write strategy section 14 which provides the data with a recording compensation process. In particular, the write strategy section 14 converts the data to be recorded into laser drive pulses which have been subject to fine adjustment of the optimum recording power in accordance with, for example, characteristics of a recording layer, a spot form of a laser beam and recording linear velocity and to adjustment of a laser drive pulse waveform. The thus obtained laser drive pulses are then supplied to the laser driver 13.

The laser driver 13 then supplies the laser drive pulses which have been subject to the recording compensation process to the laser diode in the optical pickup 1 whereby the laser diode is driven to emit laser light. In this manner, marks are formed in the optical disc 90 in accordance with the data to be recorded.

The laser driver 13 includes an auto power control (APC) circuit which controls laser output to be constant regardless of, for example, temperature, while monitoring laser output power with detector output for monitoring the laser power provided in the optical pickup 1.

Target values of the laser output for recording and reproduction are provided by the system controller 10. The laser output level for recording and reproduction is controlled to achieve the respective target value.

The optimum laser power for recording is determined through OPC described later.

An optical block servo circuit 11 generates various servo drive signals including focus, tracking and tread from a focus error signal and a tracking error signal output from the matrix circuit 4 and executes a servo operation.

In particular, the optical block servo circuit 11 generates a focus drive signal and a tracking drive signal in accordance with a focus error signal and a tracking error signal and then drives, by a two-axis driver 18, a focus coil and a tracking coil of a two-axis mechanism in the optical pickup 1. In this manner, a tracking servo loop and a focus servo loop are formed which are constituted by the optical pickup 1, the matrix circuit 4, the optical block servo circuit 11, the two-axis driver 18 and the two-axis mechanism.

The optical block servo circuit 11 turns the tracking servo loop off in accordance with a track jump instruction from the system controller 10 and outputs a jump drive signal to execute a track jump operation.

The optical block servo circuit 11 generates a sled drive signal on the basis of, for example, a sled error signal obtained as a low-frequency component of the tracking error signal and access execution control from the system controller 10, and causes a tread driver 19 to drive the sled mechanism 3. Although not unillustrated, the sled mechanism 3 includes a mechanism constituted by a main shaft, a sled motor, a transmission gear and other components. The optical pickup 1 is slidingly moved as necessary when the sled motor is driven in accordance with the sled drive signal.

The spindle servo circuit 12 controls the spindle motor 2 to rotate at CLV.

The spindle servo circuit 12 obtains clocks generated by the PLL process in accordance with the wobble signal as rotational speed information of the current spindle motor 2. The spindle servo circuit 12 compares the obtained rotational speed information with predetermined CLV reference speed information and generates a spindle error signal.

During reproduction of data, reproduction clocks generated by the PLL in the data signal processing circuit 5 are used as rotational speed information of the current spindle motor 2. Thus, a spindle error signal can be generated through comparison of the rotational speed information with predetermined CLV reference speed information.

The spindle servo circuit 12 then outputs a spindle drive signal generated in accordance with the spindle error signal and causes the spindle driver 17 to rotate at CLV of the spindle motor 2.

The spindle servo circuit 12 generates a spindle drive signal in accordance with a spindle kick/brake control signal output from the system controller 10 and also starts, stops, accelerates, reduces the spindle motor 2.

The above-described various operations of the servo systems and the recording and reproduction systems are controlled by the system controller 10 constituted by a microcomputer.

The system controller 10 executes various processes in accordance with commands output from the host device 100 via the host interface 8.

For example, when a write command is issued by the host device 100, the system controller 10 first causes the optical pickup 1 to move to an address of a site where the data should be written. The encoding and decoding section 7 then encodes the user data (e.g., video data and audio data) transmitted from the host device 100 as described above. The laser driver 13 drives the laser diode in the optical pickup 1 to emit laser light in accordance with the thus-encoded data to implement recording.

When a read command is issued by, for example, the host device 100 to instruct transmission of certain data recorded on the optical disc 90, the system controller 10 first performs seek operation control for the instructed address. In particular, the system controller 10 instructs the optical block servo circuit 11 to execute an access operation of the optical pickup 1 with respect to the address specified by the seek command.

The system controller 10 then executes motion control necessary for transmission of the data of the instructed data area to the host device 100. That is, the system controller 10 reads data out of the disc 90, causes the data detection section 5 and the encoding and decoding section 7 to reproduce the data and transmits the requested data.

The RF signal output from the matrix circuit 4 is also supplied to the evaluation value measurement section 19. The evaluation value measurement section 19 measures an evaluation value of reproduced RF signal during an OPC session which will be described later and supplies the measured evaluation value to the system controller 10.

For example, the evaluation value measurement section 19 measures a beta value, a modulation factor and asymmetry.

A memory section 20 stores parameters and constants used by the system controller 10 for various processes. The memory section 20 is constituted by, for example, a non-volatile memory.

In the later-described first and third embodiments, the memory section 20 stores coefficients for evaluation value correction, table data and other data.

Although the example of FIG. 1 has been described as a disk drive device connected to the host device 100, other disk drive devices that are not connected to other devices may also be used in the embodiment. Those disk drive devices may include an operating section or a display section, and a different interface configuration for data input and output than that of FIG. 1. It suffices that data can be recorded and reproduced in accordance with user operations and a terminal section can be provided for data input and output. Various other disk drive device configurations may also be employed.

2. First Embodiment

OPC Example I

When recording data on the disc 90, the disk drive device adjusts the recording laser power to the optimum before recording (i.e., executes an OPC session).

The laser power adjustment is achieved by test writing in a test area (i.e., an OPC area) in the disc 90.

The optimum recording laser power may be determined upon loading of the optical disc 90 or immediately before recording is started.

An OPC example I as a first embodiment will be described with reference to FIG. 2.

Figure 2:
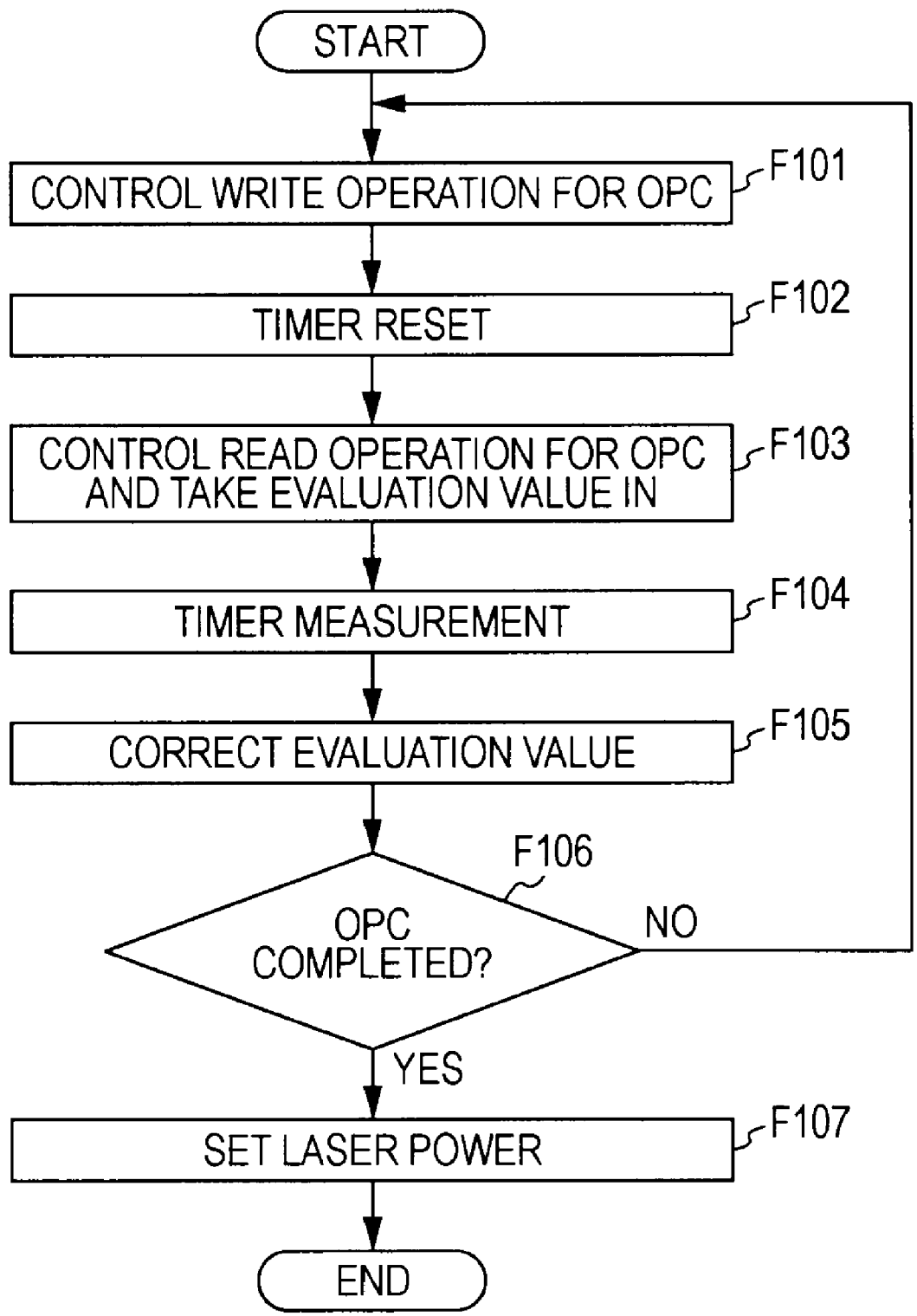
FIG. 2 is a flowchart of an OPC session according to the first embodiment.

FIG. 2 illustrates an OPC session for the system controller 10.

In step F101, a system controller 10 performs execution control of OPC test writing.

For example, the system controller 10 causes the optical pickup 1 to move to the OPC area of the disc 90. The system controller 10 then cause data for test writing (i.e., test data) to be output from the encoding and decoding section 7. The system controller 10 then controls the laser driver 13 to change the laser power stepwise.

In this manner, the test data is recorded in the OPC area with stepwise varying recording power.

The system controller 10 resets an internal timer when the OPC test writing is completed and starts counting time at this point (i.e., upon completion of the OPC test recording) in step F102.

The system controller 10 then controls an OPC reading in step F103. In particular, the system controller 10 causes the optical pickup 1 to access an initial address of the OPC area in step F101.

The system controller 10 reproduces the data in the test write recorded area.

Here, the reproduction RF signal is supplied from the matrix circuit 4 to the evaluation value measurement section 19, which measures, for example, the beta value. The system controller 10 takes in the beta values measured during the reproduction session, i.e., the beta values corresponding to stepwise varying recording laser power, from the evaluation value measurement section 19.

After the optical pickup 1 completed reproduction of the test writing area, the system controller 10 counts the time with a timer in step F104.

The time to be counted herein is the time elapsed from recording to reproduction.

In step F105, the system controller 10 corrects the beta values corresponding to the varying recording laser power obtained during test reading in step F103. The beta values are corrected on the basis of the elapsed time counted by the internal timer.

In particular, the actually measured beta values are corrected to beta values which might be obtained with the time elapsed from recording to reproduction being fixed.

It is assumed that the fixed time is 50 ms.

However, the time elapsed from recording to reproduction in the actual OPC session is not fixed due to various factors. Actual elapsed time is measured in step F104.

Figure 9A:
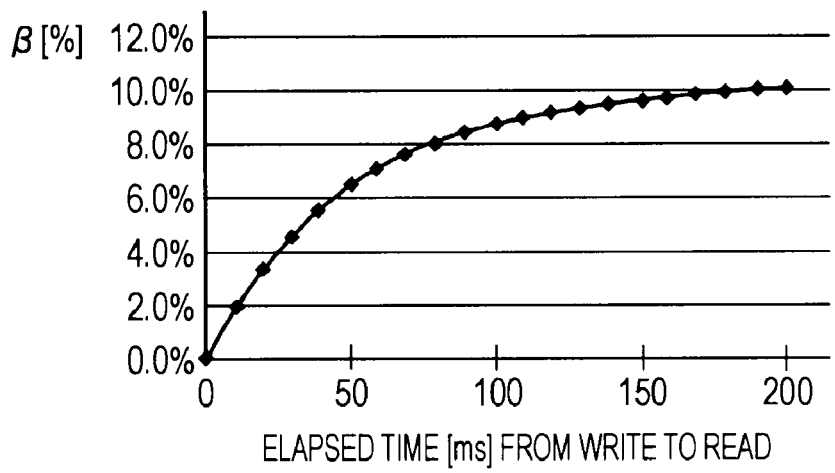
FIGS. 9A and 9B illustrate variation of evaluation values with the elapse of time from recording to reproduction.

In this example, the memory section 20 stores, as data for correction, coefficient groups, such as table data representing variation characteristics of the beta value with the elapse of time as illustrated in FIG. 9A and approximate expressions of the curve illustrated in FIG. 9A.

Such data is written in a non-volatile storage region as a memory section 20 during manufacture of the disk drive device.

The characteristic illustrated in FIG. 9A varies among discs manufactured by different manufacturers or discs of different product types.

To address this problem, variation characteristics of the beta values of the discs from various manufactures may be previously studied and the thus obtained data for correction, such as table data and approximate expressions, is stored in correlation with manufacturer codes.

The disc 90 has a manufacturer code recorded thereon in the management information for specifying the manufacturer. The system controller 10 recognizes the manufacturer code of the currently loaded disc 90 by reading the management information upon loading of the disc. Accordingly, if the data for correction is stored in correlation with the manufacturer code, the system controller 10 can read the data for correction about the currently loaded disc 90 from the memory section 20 in step F105.

Although the beta value has been described as the evaluation value in the foregoing embodiment, other evaluation values, such as a modulation factor, may also be used with the data for correction about that modulation factor being stored in advance.

After reading the data for correction, the system controller 10 corrects the actually obtained beta value into a beta value that might be obtained when fixed time (50 ms) elapses. In particular, the system controller 10 may substitute the actually measured beta value for an approximate expression and calculates the beta value that might be obtained when 50 ms elapses.

The beta values measured corresponding to the varying recording laser power are corrected in this manner.

After the beta values are thus corrected, the system controller 10 confirms in step F106 whether there is any proper beta value (i.e., a target beta value) among the corrected beta values, i.e., whether the optimum laser power has been found.

Note that the target beta value should be determined in accordance with the fixed elapsed time described above.

If any target beta value (e.g., beta value=about 5.0%) exists, the routine proceeds to step F107, where the recording laser power corresponding to that beta value is determined as the optimum power and the recording laser power is presented to the laser driver 13. The OPC session is thus completed.

If no proper beta value is found, the routine returns from step F106 to F101 to repeat the OPC session.

As described above, the system controller 10 adjusts the recording laser power suitably through OPC as illustrated in FIG. 2.

Figure 9B:
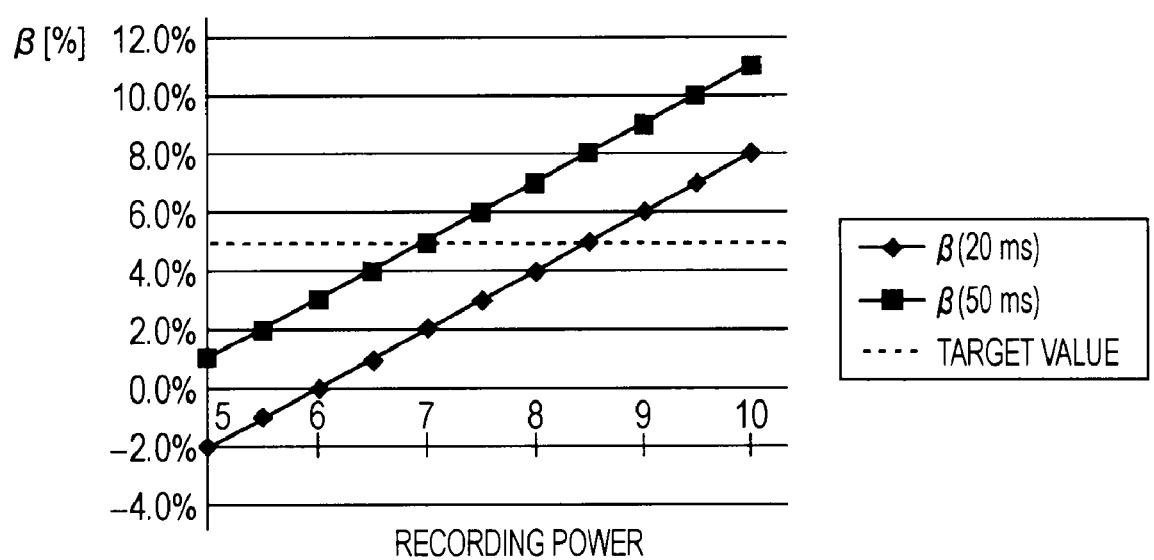

As illustrated in FIGS. 9A and 9B, since the beta value varies with the elapse of time from recording to reproduction, the beta value to be obtained varies with unfixed elapsed time during an actual OPC session. In this example, the actually measured beta values are corrected to beta values which might be obtained with fixed time elapsed (e.g., 50 ms) and the optimum recording laser power is determined on the basis of the corrected beta values. That is, influence of the beta value variation with the elapse of time is eliminated.

Accordingly, the optimum recording power can be determined precisely on the disc 90 with varying evaluation value with the elapse of time from recording to reading.

Note that the fixed elapsed time as a correction target is not necessarily 50 ms. Variation in the beta value is almost stabilized at about 200 ms as illustrated in FIG. 9A. The elapsed time as a correction target may preferably be about 200 ms.

3. Second Embodiment

OPC Example II

Figure 3:
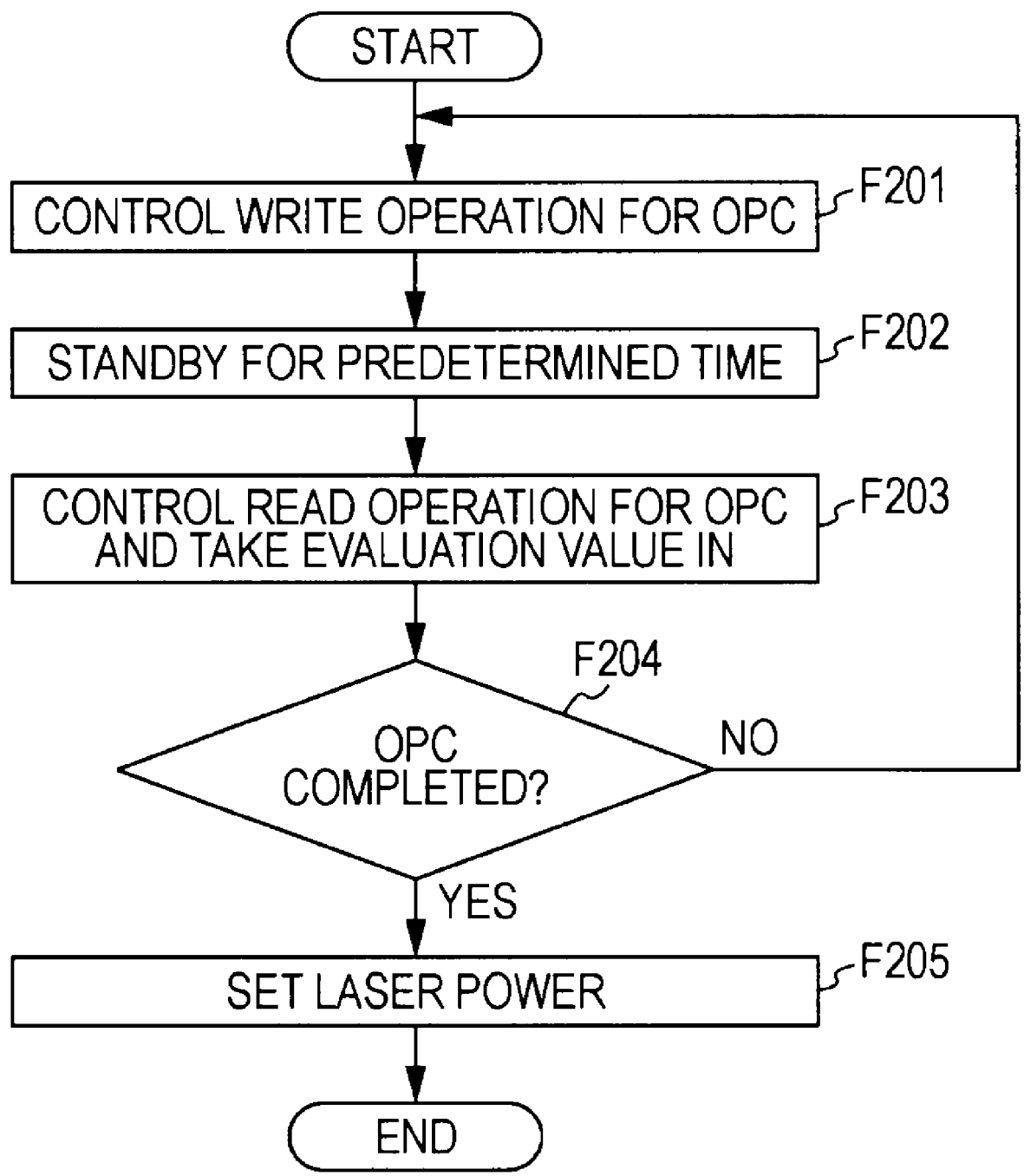
FIG. 3 is a flowchart of an OPC session according to a second embodiment.

An OPC example II of the system controller 10 as a second embodiment will be described with reference to FIG. 3.

In step F201, a system controller 10 performs execution control of OPC test writing. For example, the system controller 10 causes the optical pickup 1 to move to the OPC area of the disc 90. The system controller 10 then cause data for test writing (i.e., test data) to be output from the encoding and decoding section 7. The system controller 10 then controls the laser driver 13 to change the laser power stepwise.

In this manner, the test data is recorded in the OPC area with stepwise varying recording power.

After OPC test writing is completed, the system controller 10 stands by for a predetermined period of time in step F202. For example, the system controller 10 counts the time for 200 ms and stands by until 200 ms elapses.

The system controller 10 then controls an OPC reading in step F203. In particular, the system controller 10 causes the optical pickup 1 to access an initial address of the OPC area in step F201. The system controller 10 reproduces the data in the test write recorded area.

Here, the reproduction RF signal is supplied from the matrix circuit 4 to the evaluation value measurement section 19, which measures the beta value. The system controller 10 takes in the beta values measured during the reproduction session, i.e., the beta values corresponding to stepwise varying recording laser power, from the evaluation value measurement section 19.

Here, the beta values which are taken in are those obtained during reproduction of data recorded before at least 200 ms.

The system controller 10 confirms in step F204 whether there is any beta value corresponding to a target beta value among the corrected beta values, i.e., whether the optimum laser power has been found.

Note that the target beta value is determined in accordance with the beta value measured when the time elapsed from recording to reproduction is 200 ms or longer.

If any target beta value exists, the routine proceeds to step F205, where the recording laser power corresponding to that beta value is determined as the optimum power and the recording laser power is presented to the laser driver 13. The OPC session is thus completed.

If no proper beta value is found, the routine returns from step F204 to F201 to repeat the OPC session.

As described above, the system controller 10 adjusts the recording laser power suitably through OPC as illustrated in FIG. 2.

As described in FIGS. 9A and 9B, variation in the beta value with the elapse of time from recording to reproduction is almost stabilized at about 200 ms. If the data is reproduced and the beta value is measured after at least 200 ms elapsed, there is almost no influence of the beta value variation with the elapse of time.

Accordingly, the optimum recording power can be determined precisely on the disc 90 with varying evaluation value with the elapse of time from recording to reading.

The standby time is about 200 ms in the example in which the evaluation value is the beta value. When other evaluation values are used for OPC, elapsed time at which the evaluation values are stabilized is employed as the standby time in step F202.

Variation in the evaluation value with the elapse of time from recording to reproduction differs among discs of different manufacturers or of different product types. To address this problem, suitable standby time may be previously stored in the memory section 20 in correlation with the manufacturer codes and the standby time in step F202 may be the time read in accordance with the manufacturer code.

4. Third Embodiment

Walking OPC Example I

Next, a walking OPC example I will be described as a third embodiment.

The walking OPC is to temporarily stop recording at, for example, regular intervals or regular period of time during recording of user data in order to adjust (i.e., correct) recording laser power.

When the time has come to execute walking OPC during recording, the most recently recorded user data at that time is reproduced and an evaluation value (i.e., a beta value) is measured. Recorded data quality is evaluated on the basis of the evaluation value and recording laser power is corrected on the basis of the determination result.

For example, a previously determined target beta value is compared with the actually measured beta value to correct the recording laser power on the basis of the difference therebetween.

The recording laser power is corrected suitably during recording by walking OPC, thereby providing high recording quality.

With recent high sensitivity discs, however, since the measured beta value varies with the elapse of time from recording to reproduction during a walking OPC session, it is necessary to eliminate the influence of the variation.

Figure 4:
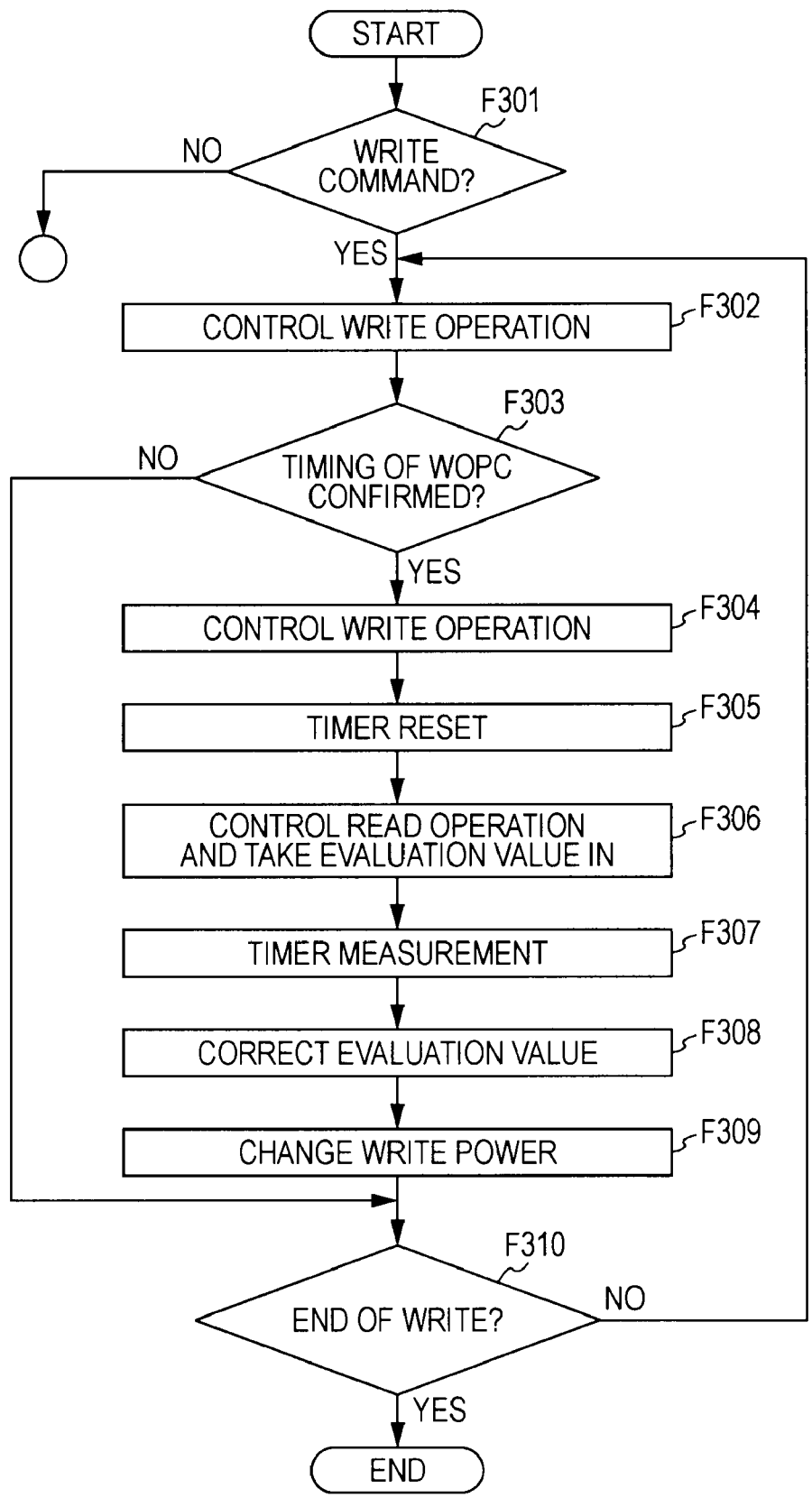
FIG. 4 is a flowchart of a walking OPC session according to a third embodiment.

In order to address this problem, the system controller 10 executes the process illustrated in FIG. 4 during a walking OPC session.

FIG. 4 illustrates a process in which user data is recorded in response to a write command from the host device 100.

In response to the write command, the routine proceeds from step F301 to step F302, where the system controller 10 controls the recording operation.

The system controller 10 causes the optical pickup 1 to move to an address of a site where the data should be written as instructed by the write command. The encoding and decoding section 7 then encodes the user data transmitted from the host device 100. The laser driver 13 then drives the laser diode in the optical pickup 1 to emit laser light in accordance with the thus-encoded data to implement recording.

This recording process is continued until it is determined in step F310 that the recording is completed. During recording, the system controller 10 confirms in step F303 whether the time has come to execute a walking OPC session.

When the time has come to execute a walking OPC session, the system controller 10 executes the processes of steps F304 to F309.

In step F304, the user data is continuously recorded and walking OPC is executed for the recorded data. Upon completion of recording in step F304, the recording is temporarily stopped and the routine proceeds to step F305.

In step F305, the system controller 10 resets an internal timer at the end of the recorded area of the most recent user data (i.e., recording in step F304) and at which recording is temporarily stopped, and starts counting time at this point.

The system controller 10 then controls reading in step F306. In particular, the system controller 10 causes the optical pickup 1 to access the area in which the user data has been recorded in step F304. That area corresponds to a recorded area immediately before the temporal stop of recording. The system controller 10 then reproduces data in the recorded data.

Here, the reproduction RF signal is supplied from the matrix circuit 4 to the evaluation value measurement section 19, which measures, for example, the beta value. The system controller 10 takes in the beta value measured during the reproduction from the evaluation value measurement section 19.

Upon completion of reproduction of the data in the recorded area immediately before the temporal stop of recording by the optical pickup 1, the system controller 10 starts counting time with a timer in step F307. The time to be counted herein is the time elapsed from recording to reproduction of the data in a recorded area immediately before the temporal stop of recording.

In step F308, the system controller 10 corrects the beta values obtained during reading in step F306.

Under the same concept as that of the first embodiment, the actually measured beta values are corrected to beta values which might be obtained with the time elapsed from recording to reproduction being fixed.

It is assumed that the fixed time is 50 ms.

However, the time elapsed from recording to reproduction in an actual OPC session is not fixed due to various factors. Actual elapsed time is measured in step F307.

In this example, as in the first embodiment, the memory section 20 stores, as data for correction, coefficient groups, such as table data representing variation characteristics of the beta value with the elapse of time as illustrated in FIG. 9A and approximate expressions of the curve illustrated in FIG. 9A.

After reading the data for correction, the system controller 10 corrects the actually obtained beta value into a beta value that might be obtained when fixed time (50 ms) elapses. In particular, the system controller 10 may substitute the actually measured beta value for an approximate expression and calculates the beta value that might be obtained when 50 ms elapses.

After the beta values are corrected, the system controller 10 corrects the laser power in step F309.

For example, the system controller 10 compares the corrected beta values with the predetermined target beta value and increases or decreases the recording laser power on the basis of the difference therebetween.

In this manner, one session of walking OPC is completed.

The routine then returns to step F302 where the temporarily stopped user data recording is resumed.

As described above, the system controller 10 corrects the recording laser power suitably through walking OPC as illustrated in FIG. 4.

In this example, as in the first embodiment, the actually measured beta values are corrected to beta values which might be obtained with fixed time elapsed (e.g., 50 ms) and the optimum recording laser power is determined on the basis of the corrected beta values. Thus, influence of the beta value variation with the elapse of time is eliminated.

Accordingly, walking OPC can be implemented precisely on the disc 90 with varying evaluation value with the elapse of time from recording to reading.

5. Fourth Embodiment

Walking OPC Example II

A walking OPC example II will be described as a fourth embodiment with reference to FIG. 5. The fourth embodiment is an example in which the concept of the second embodiment is applied to walking OPC.

Figure 5:
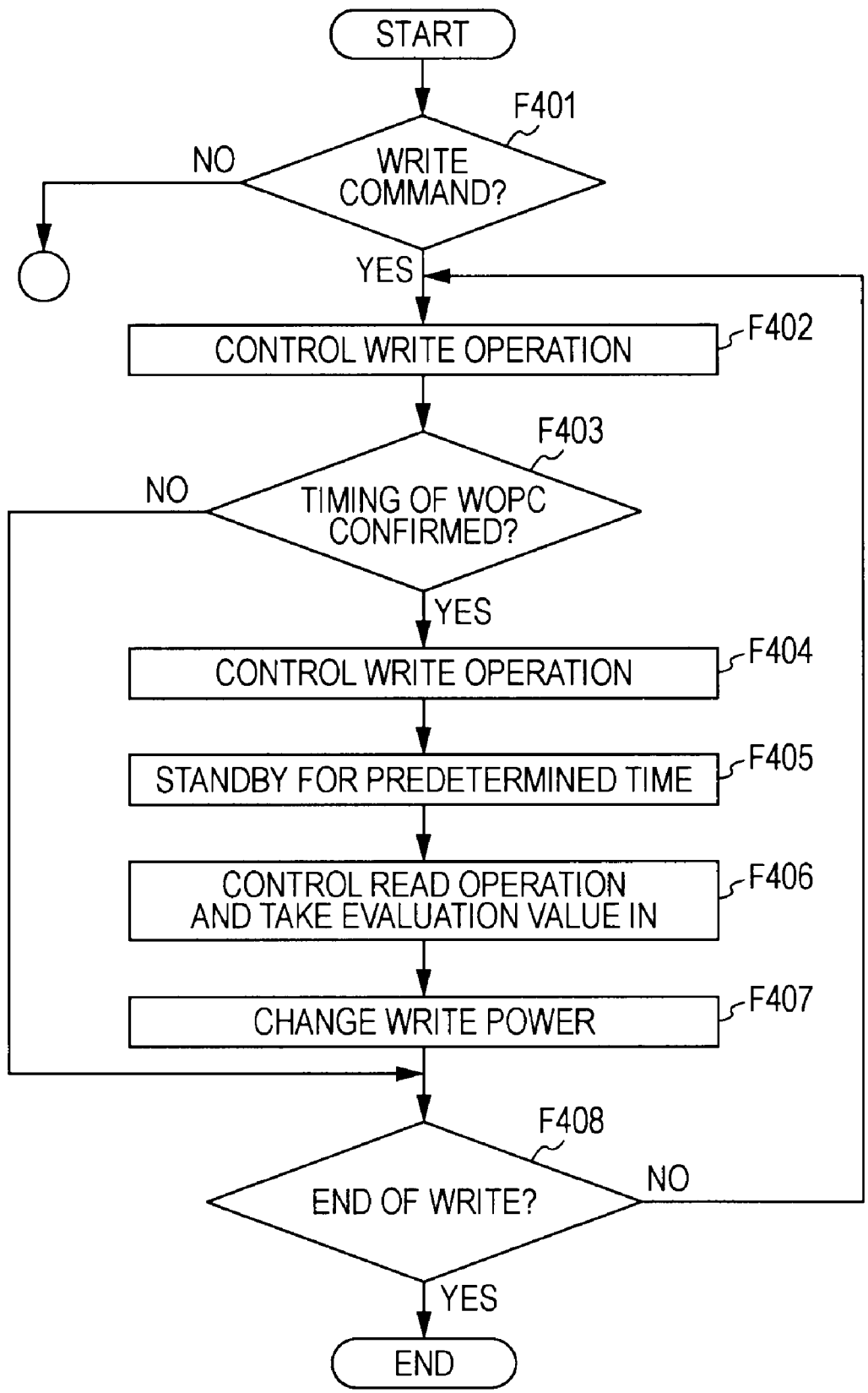
FIG. 5 is a flowchart of a walking OPC session according to a fourth embodiment.

In response to the write command from the host device 100, the routine proceeds from step F401 to F402 of FIG. 5, where the system controller 10 continues the recording process until it is determined in step F408 that the recording is completed.

In the recording process, recording of the user data is controlled. During recording, the system controller 10 confirms in step F403 whether the time has come to execute a walking OPC session.

The foregoing steps are the same as steps F301, F302, F303 and F310 of FIG. 4.

When the time has come to execute a walking OPC session, the system controller 10 executes the processes of steps F404 to F407.

In step F404, the user data is continuously recorded and walking OPC is executed for the recorded data.

Upon completion of recording in step F404, the recording is temporarily stopped and the routine proceeds to step F405 where the system controller 10 stands by for a predetermined period of time. For example, the system controller 10 counts the time for 200 ms and stands by until 200 ms elapses.

The system controller 10 then controls reading in step F406. In particular, the system controller 10 causes the optical pickup 1 to access the area in which the user data has been recorded in step F404. That area corresponds to a recorded area immediately before the temporal stop of recording. The system controller 10 then reproduces data in the recorded data.

Here, the reproduction RF signal is supplied from the matrix circuit 4 to the evaluation value measurement section 19, which measures the beta value. The system controller 10 takes in the beta value measured during the reproduction from the evaluation value measurement section 19.

Here, the beta values which are taken in are those obtained during reproduction of data recorded before at least 200 ms.

In step F407, the system controller 10 corrects the laser power on the basis of the beta values obtained during reading in step F406.

For example, the system controller 10 compares the taken-in beta values with the predetermined target beta value and increases or decreases the recording laser power on the basis of the difference therebetween.

In this manner, one session of walking OPC is completed. The routine then returns to step F302 where the temporarily stopped user data recording is resumed.

As described above, the system controller 10 corrects the recording laser power suitably through OPC as illustrated in FIG. 5.

As described in FIGS. 9A and 9B, variation in the beta value with the elapse of time from recording to reproduction is almost stabilized at about 200 ms. If the data is reproduced and the beta value is measured after at least 200 ms elapsed, there is almost no influence of the beta value variation with the elapse of time.

Accordingly, walking OPC can be implemented precisely on the disc 90 with varying evaluation value with the elapse of time from recording to reading.

The standby time is about 200 ms in the example in which the evaluation value is the beta value. When other evaluation values are used for OPC, elapsed time at which the evaluation values are stabilized is employed as the standby time in step F405.

Variation in the evaluation value with the elapse of time from recording to reproduction differs among discs of different manufacturers or of different product types. To address this problem, suitable standby time may be previously stored in the memory section 20 in correlation with the manufacturer codes and the standby time in step F202 may be the time read in accordance with the manufacturer code.

6. Fifth Embodiment

Walking OPC Example III

Next, a walking OPC example III will be described as a fifth embodiment with reference to FIGS. 6 and 7.

In a walking OPC session, recording of the user data is temporarily stopped and the data in the recorded area is reproduced to obtain an evaluation value. The data reproduced in order to obtain the evaluation value is not limited to the data recorded immediately before the temporal stop. Thus, there exists a recorded area in which data is recorded before at least a predetermined period of time, where it is not necessary that the system controller 10 stands by for a predetermined period of time as in the walking OPC example II. From such a standpoint, the process example III described below obtains a stable evaluation value from a recorded area in which data is recorded before, for example, at least 200 ms without necessity of standby or correcting the evaluation value.

Figure 6:
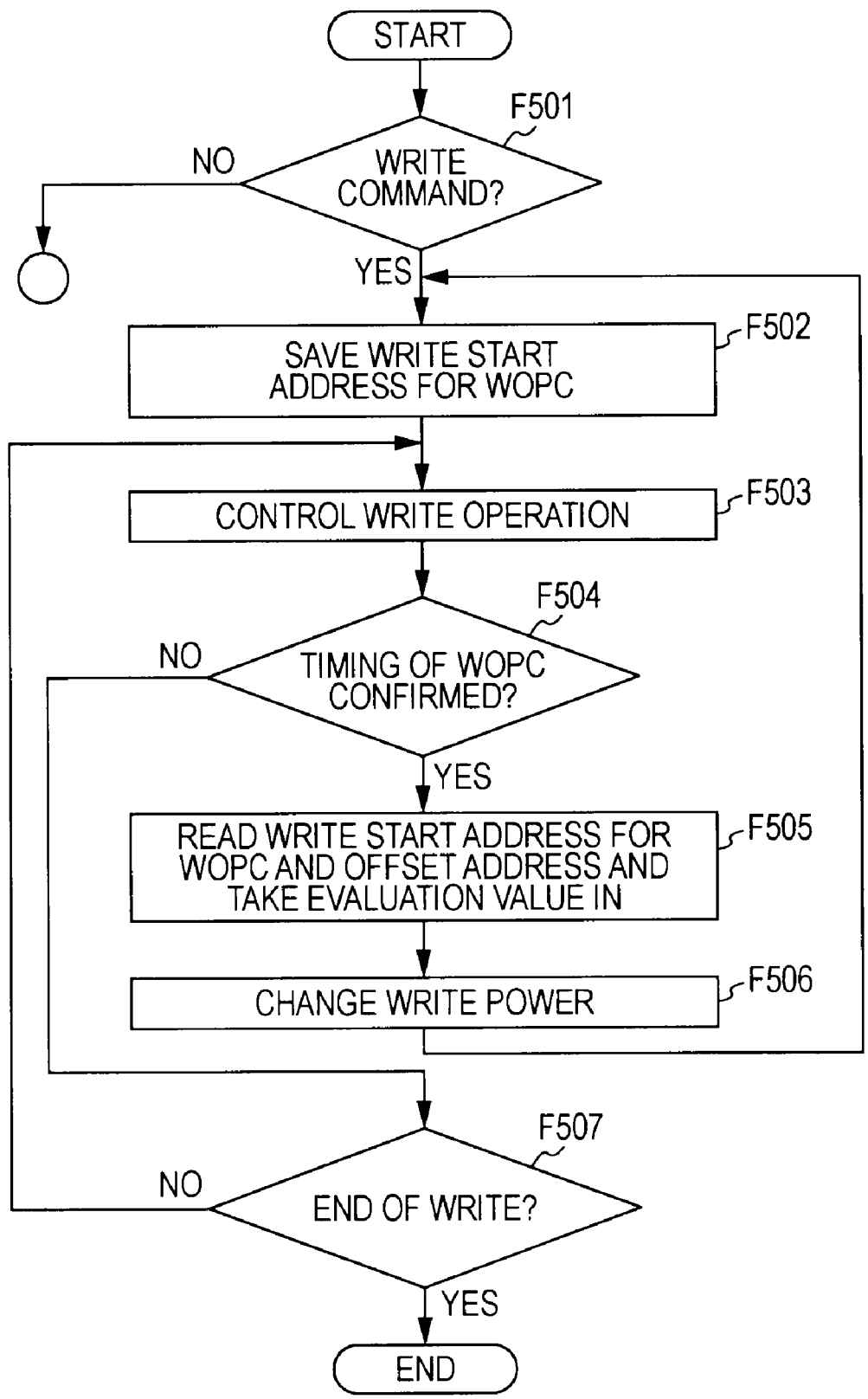
FIG. 6 is a flowchart of a walking OPC session according to a fifth embodiment.

In the process of FIG. 6, when a write command is issued by the host device 100, the routine proceeds from step F501 to F502 where the system controller 10 first saves a recording start address for walking OPC (WOPC). The system controller 10 saves the recording start address specified by the write command first.

Figure 7:
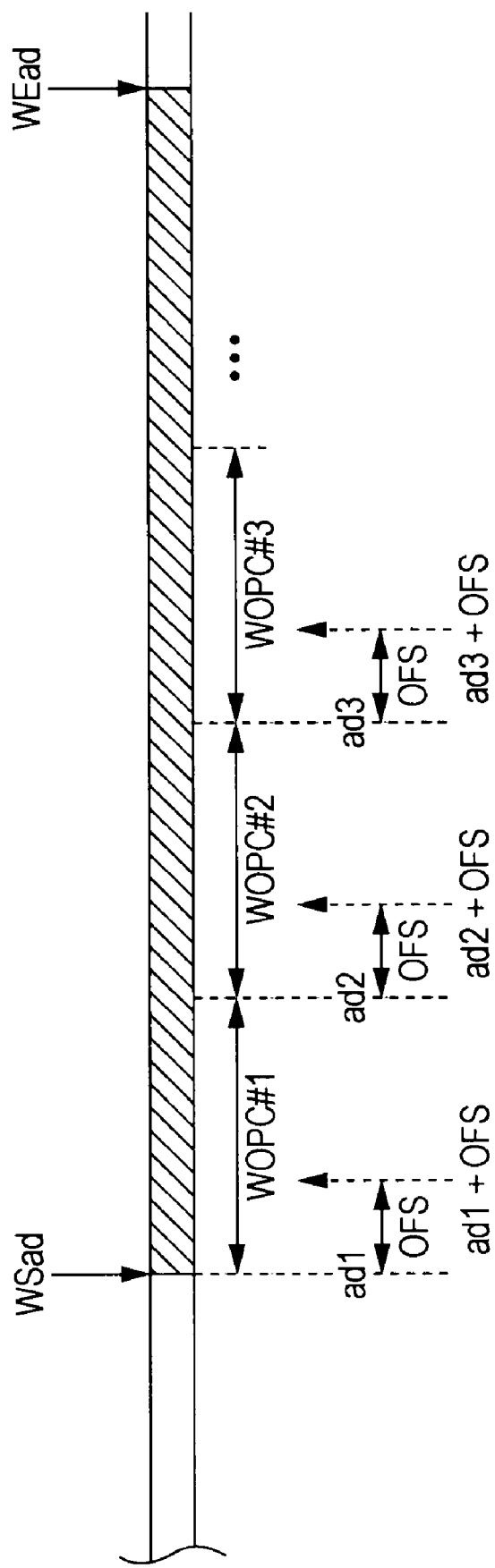
FIG. 7 illustrates walking OPC session according to the fifth and sixth embodiments.

FIG. 7 schematically illustrates a recording area on the disc 90. Here, it is assumed that the write command issued by the host device 100 instructs recording the user data in an area ranging a recording start address WSad and a recording end address WEad.

During recording in response to the write command, the disk drive device executes walking OPC sessions at predetermined intervals (i.e., at predetermined periods of time or at predetermined sections). Here, it is assumed that WOPC#1, WOPC#2 and WOPC#3 . . . in FIG. 7 each correspond to a section in which one session of walking OPC is executed.

The WOPC recording start address first saved in step F502 corresponds to an address ad1 (=WSad) of FIG. 7.

After saving the WOPC recording start address, the system controller 10 starts recording of user data in response to the write command in step F502.

In particular, the system controller 10 causes the optical pickup 1 to move to an address WSad of a site where the data should be written as instructed by the write command. The encoding and decoding section 7 then encodes the user data transmitted from the host device 100. The laser driver 13 then drives the laser diode in the optical pickup 1 to emit laser light in accordance with the thus-encoded data to start recording.

The recording is continued until it is determined in step F507 that the recording is completed. During recording, the system controller 10 confirms in step F504 whether the time has come to execute a walking OPC session.

In the example of FIG. 7, when the time has come to execute the first walking OPC session when data is recorded in the first section WOPC#1.

The system controller 10 then performs the processes of steps F505 and F506.

In step F505, data is reproduced at an address where predetermined offset address OFS is added to the WOPC recording start address saved in step F502.

The address is illustrated as "ad1+OFS" in FIG. 7.

In this step F505, the system controller 10 causes the optical pickup 1 to access the address "ad1+OFS" and reproduce the data within a predetermined section from that address.

At this time, the reproduction RF signal is supplied to the evaluation value measurement section 19 from the matrix circuit 4 and the beta value is measured at the evaluation value measurement section 19. The system controller 10 takes in the beta value measured during reproduction from the evaluation value measurement section 19.

The beta value which is taken in can be the beta value obtained during reproduction of the data recorded at least 200 ms before the reproduction, for example. That is, the offset address OFS is determined such that the data recorded at least 200 ms before the time of execution of WOPC.

In step F506, the system controller 10 corrects the laser power on the basis of the beta values obtained during reading in step F505.

For example, the system controller 10 compares the taken-in beta values with the predetermined target beta value and increases or decreases the recording laser power on the basis of the difference therebetween.

In this manner, one session of walking OPC is completed.

In walking OPC, data recorded at least 200 ms before is recorded and the beta value is measured. Thus, there is almost no influence of variation of the beta value with the elapse of time.

Accordingly, walking OPC can be implemented precisely on the disc 90 with varying evaluation value with the elapse of time from recording to reading.

The routine then returns to steps F502 and F503, where the temporarily stopped recording of the user data is resumed.

In step F502, an execution section (i.e., an initial address ad2 of WOPC#2 of FIG. 7) of the next walking OPC session is saved. That is, the address of a site where recording of the user data is resumed is saved.

In step F503, the user data continued from the address ad2 is recorded.

Then, the user data is recorded in the WOPC#2 section. When the time has come to execute a walking OPC session again, the system controller 10 controls execution of walking OPC in steps F505 and F506 in a similar manner.

WOPC reading is executed at a site represented by the address "ad2+OFS" in FIG. 7. The system controller 10 reproduces data in the address "ad1+OFS," obtains the beta value and corrects the recording laser power on the basis of the obtained beta value.

The following processes are the same as in the foregoing embodiments. These processes are continued until it is determined in step F507 that the recording is completed.

As described above, according to the process of FIG. 6, the data recorded at least 200 ms before is read and the beta value is obtained for walking OPC.

That is, through reproduction of the data recorded at least a predetermined period of time before the most recent recording, an evaluation value after a predetermined period of time elapsed can be obtained as a beta value obtained from the reproduction signal during reproduction. Accordingly, the stabilized beta value can be obtained without providing standby time or correcting the obtained evaluation value. Thus, the walking OPC session is executed precisely.

7. Sixth Embodiment

Walking OPC Example IV

Next, a walking OPC example IV of the sixth embodiment will be described with reference to FIG. 8.

This is an example in which walking OPC for the next recording can be executed suitably even if the write command instructs recording data in a very short section.

Figure 8:
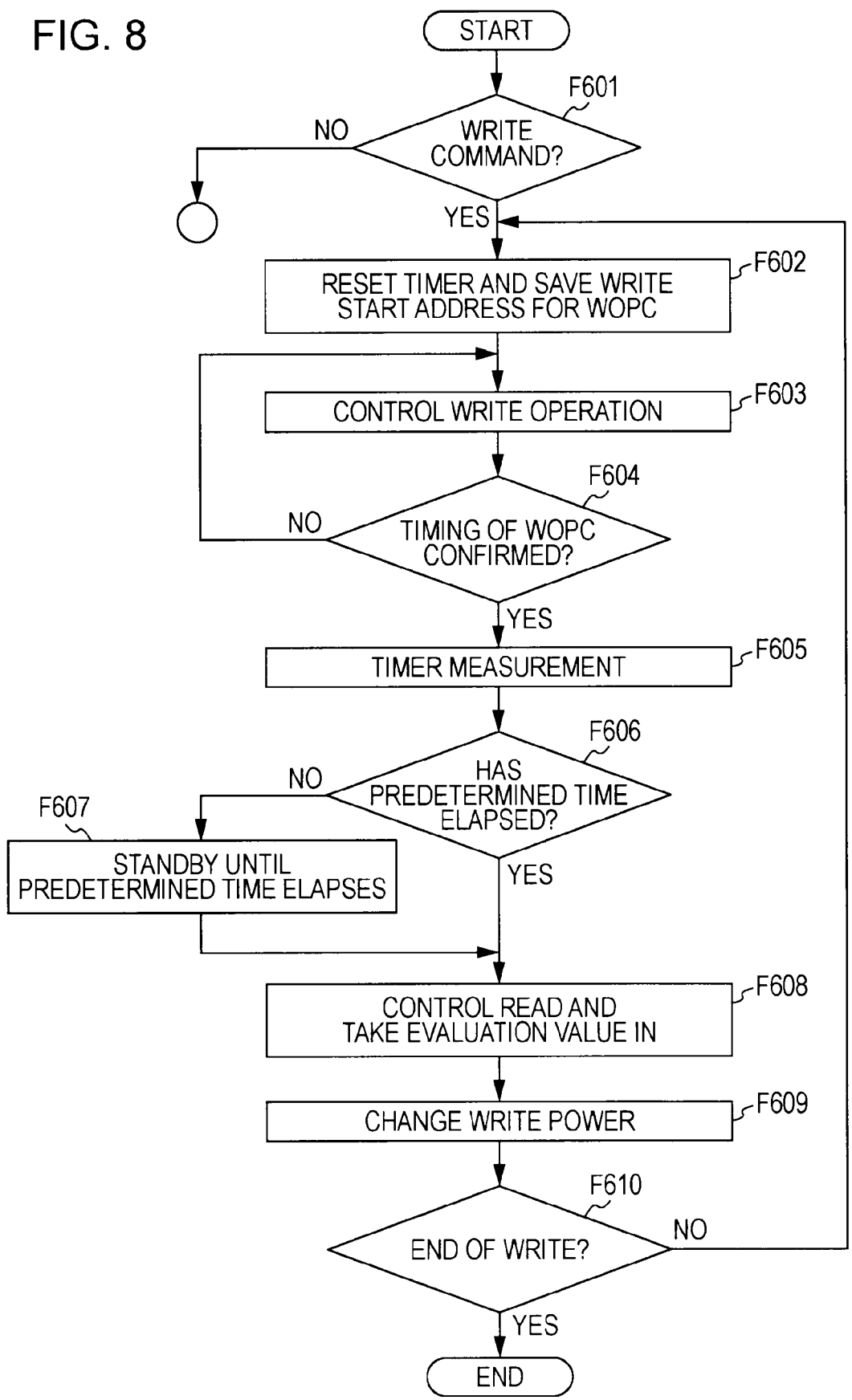
FIG. 8 is a flowchart of the walking OPC session according to the sixth embodiment.

In FIG. 8, when a write command is issued from the host device 100, the routine proceeds from step F601 to F602, where the system controller 10 first resets the internal timer and starts counting time. The system controller 10 also saves a recording start address for walking OPC (WOPC). Similar to those examples illustrated in FIGS. 6 and 7, the system controller 10 saves the recording start address specified by the write command first.

After saving the address of starting counting time and the WOPC recording start address, the system controller 10 starts recording user data in response to the write command in step F603.

This recording process is continued until it is determined in step F610 that the recording is completed. During recording, the system controller 10 confirms in step F604 whether the time has come to execute the walking OPC session.

The time to execute the walking OPC session herein is the time at which a predetermined period of time or a predetermined section has elapsed during recording, and the time at which recording is completed.

That is, in step F604, the system controller 10 monitors temporal stop of recording in the predetermined section (e.g., the section WOPC#1 of FIG. 7) during recording and, at the same time, monitors completion of recording.

When the time has come to execute the walking OPC session upon temporal stop of recording in the predetermined section or upon completion of recording, the routine proceeds from step F604 to F605. The system controller 10 confirms the counted value of the timer at this point.

That is, the system controller 10 confirms the time elapsed after recording of data in this walking OPC section is started.

In subsequent step F606, the system controller 10 confirms whether the elapsed time is longer than the predetermined time (e.g., at least 200 ms).

If the elapsed time is longer than the predetermined time, the system controller 10 executes read control in step F608. For example, the system controller 10 causes the optical pickup 1 to access the WOPC recording start address saved in step F602 and reproduce the data.

Here, the reproduction RF signal is supplied from the matrix circuit 4 to the evaluation value measurement section 19, which measures the beta value. The system controller 10 takes in the beta value measured during the reproduction from the evaluation value measurement section 19.

Here, the beta values which are taken in are those obtained during reproduction of data recorded before at least 200 ms. This is because it has been confirmed in step F606 that predetermined time (i.e., 200 ms) has been elapsed since the recording is started.

In step F609, the system controller 10 corrects the laser power on the basis of the beta values obtained during reading in step F608.

For example, the system controller 10 compares the taken-in beta values with the predetermined target beta value and increases or decreases the recording laser power on the basis of the difference therebetween.

If it is confirmed in step F606 that predetermined time (e.g., at least 200 ms) has not been elapsed since the recording of the walking OPC section in this session is started, the system controller 10 stands by until the predetermined time elapses in step F607. For example, the system controller 10 stands by until at least 200 ms measured by the timer elapses.

After the standby time elapsed, the routine proceeds to step F608, where the system controller 10 similarly causes the optical pickup 1 to access the WOPC recording start address saved in step F602 and reproduced the data. The system controller 10 then obtains the beta value and corrects the recording laser power on the basis of the beta value in step F609.

Here, the beta values which are taken in through the standby in step F607 are those obtained during reproduction of data recorded before at least 200 ms.

When one session of walking OPC is completed as described above, the routine returns to steps F602 and F603, where the temporarily stopped recording of the user data is resumed.

In step F602, the system controller 10 saves the address at which the next walking OPC section starts, i.e., the address at which recording of the user data is resumed, and resets and starts the internal timer. Recording of the user data is continued in step F603.

When the time has come to execute the walking OPC session again, the system controller 10 controls execution of walking OPC in steps F605 to F609 in a similar manner.

The system controller 10 reads the address saved in step F602 at which the walking OPC section starts.

Such a process is continued until it is determined in step F610 that the recording is completed.

According to the process of FIG. 8, if a predetermined period of time has elapsed since the user data recording was started, the system controller 10 reproduces the area recorded at least a predetermined period of time before the most recent recording. If a predetermined period of time has not elapsed since the user data recording was started, the system controller 10 stands by until a necessary period of time elapses. The system controller 10 reproduces the data recorded at least a predetermined period of time before the most recent recording with the standby time included. An evaluation value of data which is reproduced after a predetermined period of time has elapsed since it was recorded is obtained as the evaluation value which can be obtained from the reproduction signal during reproduction.

First, in particular, the system controller 10 first reads the address at which the walking OPC section starts, i.e., the address at which data has been recorded for at least 200 ms, and then obtains the beta value. In this manner, stable beta values can be obtained with almost no influence of variation in the beta values even no standby time before reading is provide or even no correction is made on the obtained beta values. Thus, the walking OPC session is executed precisely.

Second, even if recording in a short section is instructed by a write command and recording was completed before the time at which the data has been recorded for 200 ms, the system controller 10 stands by in step F607 for a necessary period of time before reading the address at which the walking OPC section starts and obtaining the beta values. The beta values obtained here also are stable with almost no influence of variation of the beta values with the elapse of time. Accordingly, the recording laser power for the next recording can be determined suitably.

During reading control in step F608, the system controller 10 may alternatively cause the optical pickup 1 to access a position other than the address saved in step F602. For example, the system controller 10 may cause the optical pickup 1 to access a position represented by an address "ad1+OFS" in FIG. 7. In that case, however, the predetermined period of time used for comparison in step F606 should be, for example, (200 ms)+(necessary recording time for offset OFS).

Although embodiments have been described, various modified embodiments of the invention can be conceived of. Detailed processes are not limited to those illustrated in FIGS. 2 to 8 and other processes may be employed.

The invention is applicable to various optical recording systems including a Blu-ray disc system.

The present application contains subject matter related to that disclosed in Japanese Priority Patent Application JP 2009-177296 filed in the Japan Patent Office on Jul. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
    an optical head section for irradiating a recording medium with laser to record and reproduce information;
    a laser driving section for driving the optical head section to output laser; and
    a control section for, in a process of adjusting recording laser power output from the optical head section, obtaining an evaluation value of a recorded area after a predetermined period of time elapsed since data was recorded as an evaluation value about a reproduction signal during reproduction of the recorded data, and adjusting recording laser power on the basis of the evaluation value after the predetermined period of time elapsed since data was recorded.

2. The recording device according to claim 1, wherein:
    the control section causes the optical head section and the laser driving section to execute test recording on the recording medium and, immediately after that, reproduce the test recording execution area; and
    the control section obtains the evaluation value after the predetermined period of time elapsed since data was recorded through correction of the evaluation value obtained from a reproduction signal during reproduction in accordance with the elapse of time from test recording to the reproduction.

3. The recording device according to claim 1, wherein:
    the control section causes the optical head section and the laser driving section to execute test recording on the recording medium and, after predetermined standby time, reproduce the test recording execution area to obtain the evaluation value after the predetermined period of time elapsed since data was recorded as the evaluation value obtained from a reproduction signal during reproduction.

4. The recording device according to claim 1, wherein:
as a process of adjusting the recording laser power during recording user data on a recording medium by the optical head section and the laser driving section, the control section reproduces data in an area recorded immediately therebefore and thus obtains the evaluation value after the predetermined period of time elapsed since data was recorded by correcting the evaluation value obtained from a reproduction signal during reproduction in accordance with the elapse of time from recording to the reproduction in the area and adjusts the recording laser power during recording on the basis of the evaluation value after the predetermined period of time elapsed since data was recorded.

5. The recording device according to claim 1, wherein:
as a process of adjusting the recording laser power during recording user data on a recording medium by the optical head section and the laser driving section, the control section reproduces, with predetermined standby time since the most recent recording, data in an area recorded immediately therebefore and thus obtains the evaluation value after the predetermined period of time elapsed since data was recorded as the evaluation value obtained from a reproduction signal during reproduction, and adjusts recording laser power for recording on the basis of the evaluation value after the predetermined period of time elapsed since data was recorded.

6. The recording device according to claim 1, wherein:
as a process of adjusting the recording laser power during recording user data on a recording medium by the optical head section and the laser driving section, the control section reproduces data in an area recorded a predetermined period of time before the most recent recording, and thus obtains the evaluation value after the predetermined period of time elapsed since data was recorded as the evaluation value obtained from a reproduction signal during reproduction, and adjusts recording laser power for recording on the basis of the evaluation value after the predetermined period of time elapsed since data was recorded.

7. The recording device according to claim 1, wherein:
as a process of adjusting the recording laser power during recording user data on a recording medium by the optical head section and the laser driving section, if a predetermined period of time has elapsed since the user data recording was started, the control section reproduces an area in which data was recorded at least a predetermined period of time before the recording of the user data and, if a predetermined period of time has not elapsed since the user data recording was started, the control section stands by for a necessary period of time and then reproduces an area which is considered to be recorded at least a predetermined period of time before the most recent recording, and thus obtains the evaluation value after the predetermined period of time elapsed since data was recorded as the evaluation value obtained from a reproduction signal during reproduction, and adjusts recording laser power for recording on the basis of the evaluation value after the predetermined period of time elapsed since data was recorded.

8. A method of adjusting recording laser power of a recording device which irradiates a recording medium with laser for recording and reproducing information, the method comprising steps of:
obtaining an evaluation value after the predetermined period of time elapsed since data was recorded in a recorded area as an evaluation value about a reproduction signal during reproduction of the recorded data, and adjusting recording laser power on the basis of the evaluation value after the predetermined period of time elapsed since data was recorded.

* * * * *